Figure 1:
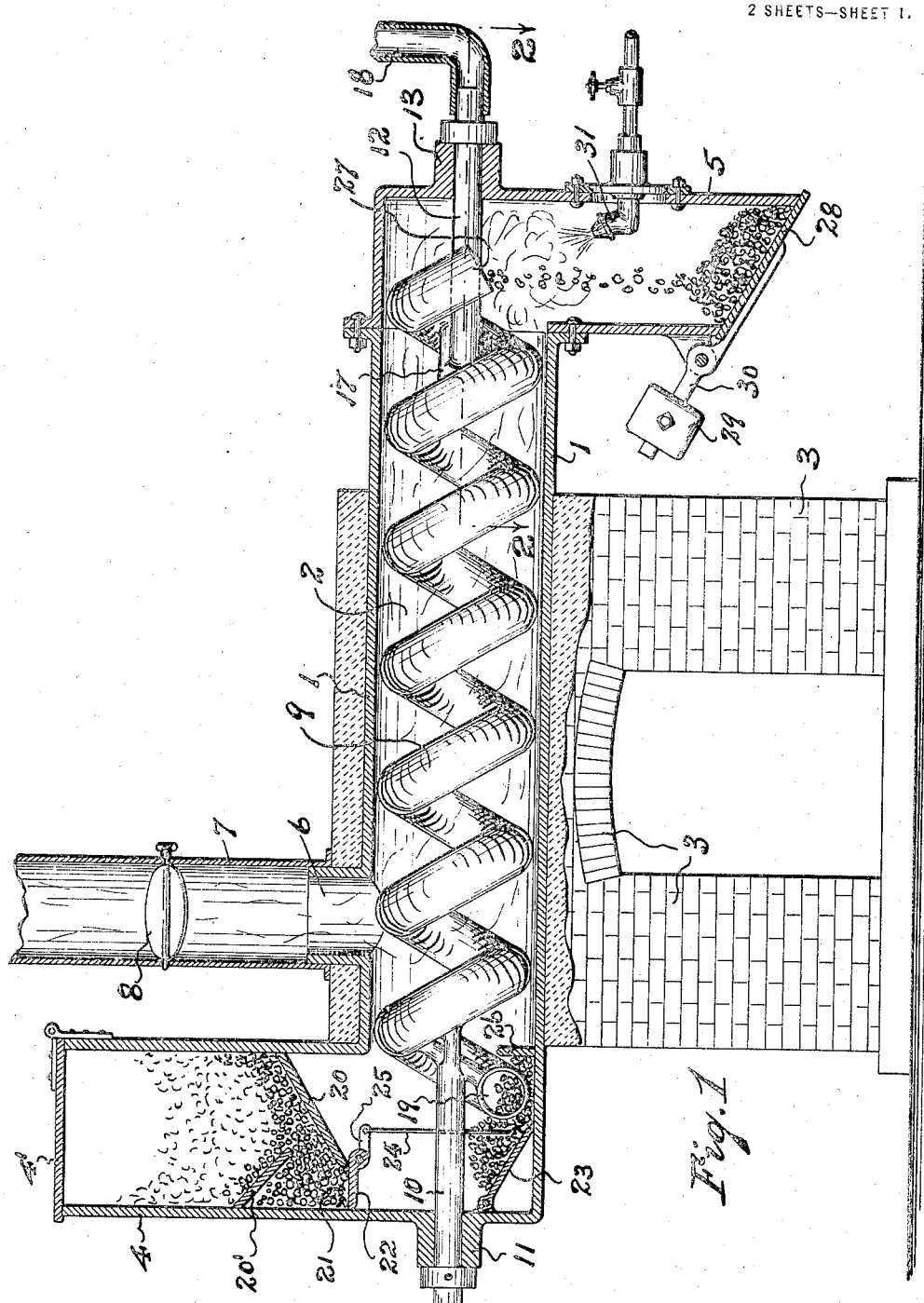

S. SCHIEFFELIN.
RETORT.
APPLICATION FILED JUNE 19, 1920.

1,381,936.

Patented June 21, 1921.
2 SHEETS—SHEET 1.

INVENTOR
Schuyler Schieffelin,
BY
Frantzef & Richards,
ATTORNEYS

S. SCHIEFFELIN.
RETORT.
APPLICATION FILED JUNE 19, 1920.

1,381,936. Patented June 21, 1921.
2 SHEETS—SHEET 2.

INVENTOR
Schuyler Schieffelin,
BY
Fraentzel and Richards
ATTORNEYS

UNITED STATES PATENT OFFICE.

SCHUYLER SCHIEFFELIN, OF TUXEDO PARK, NEW YORK, ASSIGNOR TO HARRY L. BROWN, OF NEWARK, NEW JERSEY.

RETORT.

1,381,936. Specification of Letters Patent. Patented June 21, 1921.

Application filed June 19, 1920. Serial No. 390,130.

*To all whom it may concern:*

Be it known that I, SCHUYLER SCHIEFFELIN, a citizen of the United States, residing at Tuxedo Park, in the county of Orange, and State of New York, have invented certain new and useful Improvements in Retorts; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in oil eduction apparatus for the recovery of oil from shales and other similar materials containing hydro-carbonaceous substances; and the invention also embraces an apparatus useful in the reduction ores in an atmosphere free from oxygen.

The invention has for its principal object to provide a novel construction of helically or spirally formed rotating still which serves both to continuously feed the material treated and to agitate the same while being subjected to the influence of heat for volatilizing the hydro-carbonaceous content thereof.

The invention also has for a further object to provide a novel furnace structure with which said still is combined, together with a novel arrangement of means for feeding and discharging the material treated.

Another object of the invention comprises an arrangement or modification of the novel helically or spirally formed rotating still readily adapting the same to secure fractional volatilization or distillation of the hydro-carbonaceous substance, whereby the lighter substances distilling at comparatively low temperatures will be quickly accumulated and discharged from the still, while the heavier substances distilling at higher temperatures will receive the continued increasing influence of the heat until distilled, whereupon the same will be separately discharged from the still.

Other objects of the present invention, not at this time more particularly enumerated, will be clearly understood from the following detailed description of the same.

With the various objects of the invention in view, the same consists, primarily, in the novel combined still and furnace or eduction apparatus hereinafter set forth; and, the invention consists, furthermore, in the novel arrangements and combinations of the various devices and parts, as well as in the details of the construction of the same, all of which will be hereinafter more fully described, and then finally embodied in the claims appended hereto.

The invention is clearly illustrated in the accompanying drawings, in which:—

Figure 2:
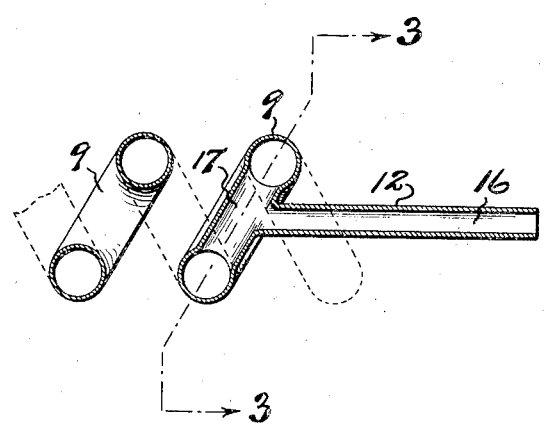
Figure 3:
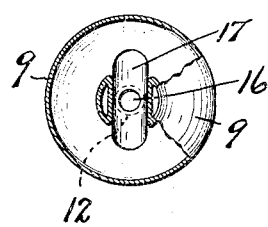
Figure 4:
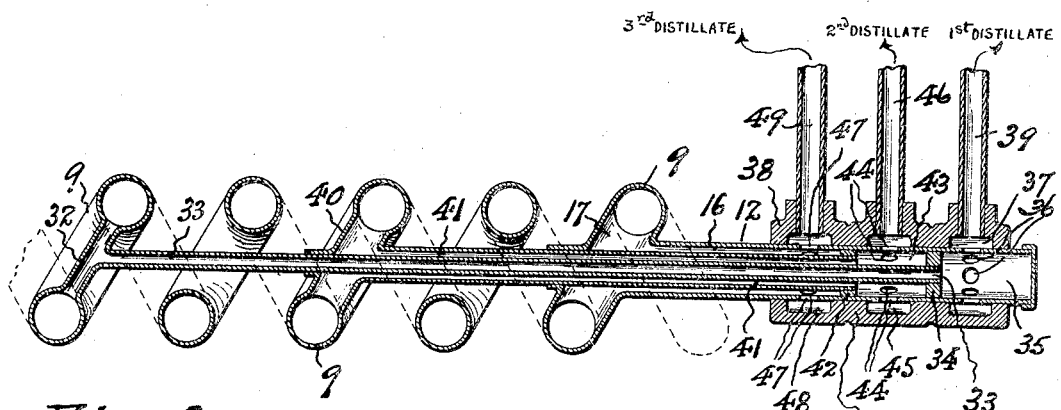

Figure 1 represents a vertical longitudinal section of the novel eduction apparatus with the still shown in elevation; Fig. 2 is a detail horizontal section through the discharge end of the still, said section being taken on line 2—2 in said Fig. 1; Fig. 3 is a detail transverse section taken on line 3—3 in said Fig. 2; and Fig. 4 is a detail longitudinal section of the discharge end of the still modified to operate in a manner producing fractional distillation of the substances treated therein.

Similar characters of reference are employed in all of the hereinabove described views, to indicate corresponding parts.

Referring now to said drawings, the reference-character 1 indicates a cylindrical horizontally disposed furnace shell providing an internal combustion chamber 2. Said shell 1 is suitably mounted or supported upon a brick-work foundation 3, or by means of any other suitably constructed support. If desired the still may be arranged on an inclined axis. Connected in communication with the forward end of said furnace shell 1 is a vertically disposed upwardly extending feed hopper or magazine 4. Connected in communication with the rearward or opposite end of said furnace shell 1 is a vertically disposed downwardly extending discharge well 5.

The reference-character 6 indicates a vent leading out of said combustion chamber 2 of said furnace shell, coupled with which is a suitable draft stack 7 provided with any desired form of damper means 8.

The reference character 9 indicates a hollow helically or spirally convoluted still mounted to rotate in longitudinally disposed horizontal or inclined position within the combustion chamber 2 of said shell 1. Said still is provided at its forward end with an axially alined journal 10 mounted in a bearing 11 provided in connection with said shell 1, and said still is provided at its opposite end with a tubular axially alined journal 12 mounted in an opposite bearing 13 provided in connection with said shell 1. Secured upon the exteriorly projecting end of said journal 10 is a pulley 14 over which runs a driving belt 15, driven from any suitable power source, whereby said still is rotated on its longitudinal axis. Said tubular journal 12 provides a vapor discharge passage 16 which communicates, at its inner end, preferably with the interior of the rearmost convolutions of the still through the interconnecting transverse coupling pipe or duct member 17. The external end of said tubular journal 12 telescopes into the end of a conveyer pipe or duct 18, through which the discharged vapors may be conducted to a suitable condensing apparatus. (Not shown.)

The forward or dipping end 19 of said still is positioned beneath feed hopper or magazine 4. Arranged within said hopper 4, above said dipping end 19 of said still, is a transverse downwardly inclined hopper bottom 20 arranged to extend across the major portion of the cross-sectional area of the hopper, but terminating short of the front wall of the latter so as to provide a feed opening 21 through which the material may drop into the forward end of said shell 1 in position to be picked up by the said dipping end 19 of the still when the latter is rotated. A pivoted gate or cut-off member 22 is arranged to coöperate with said opening 21 to open and close the same. A baffle 20' above said opening 21 holds the weight of the major bulk of material off the gate or cut-off member 22. Pivotally mounted at the bottom of the forward end of said shell 1 is a gate actuating plate 23 interconnected by a pull cord 24, or similar means, with the lever arm 25 which causes the opening and closing movements of said gate or cut-off member 22. Disposed in the bottom of said shell, in the rear of the path of rotation of said dipping end 19 of said still, is a stop partition 26 against which the material is brought to rest so as to lie in the path of and so as to be taken up by said dipping end of the still. The upper or receiving end of said feed magazine or hopper 4 is normally closed by a cover or door 4'.

The rearward or discharge end 27 of the still is positioned over the discharge well 5. The open bottom of said discharge well 5 is normally closed by a pivoted cover or door member 28, which is maintained in normal closed position by means of a counterweight 29 fixed on the lever arm 30 of said cover or door member.

Connected with said discharge well 5, so as to extend through the outer wall of the same, and so as to be thus positioned within the interior of the well adjacent to the rearward end of said shell 1, is a burner 31 adapted to be supplied with any suitable gaseous or liquid fuel, which when ignited produces a flow of hot products of combustion in circulation through the interior of said shell and about the rotating still.

In the operation of the above described apparatus, when utilizing the same to distil off the hydrocarbonaceous content of shale and other similar materials, the said material to be treated is preferably crushed to produce a mass of comparatively small sized pieces. The magazine or hopper 4 is opened and a quantity of the said crushed material is deposited therein to rest upon said hopper bottom 20, baffle 20', and upon said gate or cut-off member 22. The weight of the said material bearing upon said gate or cut-off member 22 tends to swing the latter open so that the material drops downwardly into the forward end of the shell 1. As the gate or cut-off member swings downwardly to open position, the lever arm 25 swings upwardly, thus swinging to upwardly raised position the gate actuating plate 23, so that the material falling from the hopper is deposited on said plate 23 and when sufficient weight of material accumulates thereon bears or swings down the same tending to thereby swing the gate or cut-off member to closed position, and consequently stopping the feeding of material from the magazine or hopper 4. In this manner the flow of material from the magazine or hopper 4 is automatically controlled so that only the desired quantity of material is delivered from time to time to be picked up by the dipping end 19 of the still 9 for travel through the latter.

The fuel supply being turned on to flow to the burner 31, the latter is ignited, so that combustion of the fuel is initiated within the furnace shell 1, the hot gases or products of combustion passing through the interior of the shell and surrounding the still 9, and thence being vented through the stack 7.

The still 9 is slowly rotated. The rotation of said still 9 causes the dipping end 19 thereof to dip into the pile of material deposited within the forward end of the shell 1, whereby at each revolution of the still 9 a small quantity of the material is picked up thereby and caused to enter the interior of the still. Owing to the novel helically or spirally convoluted shape of the still the material thus caused to enter the forward end thereof is tumbled about within the interior, and by the rotative movement of the still is caused to travel rearwardly from convolution to convolution until it reaches the discharge end 27 of the still from which the treated material or refuse falls into the discharge well 5. The advantage of the rotating convoluted still is that it automatically picks up and propels the material through its interior in desired quantity portions and at the same time, in addition to the traveling movement imparted to the material, the material is likewise constantly agitated or tumbled about, so that all particles of material are adequately subjected to the influence of the heat generated in the shell 1, and the hydro-carbonaceous content of the material is readily expelled from the material by the influence of said heat. By the time the material has reached the discharge end of the still, the hydro-carbonaceous content has been substantially entirely liberated therefrom so that nothing remains but the charred refuse which upon ejection from the still falls into the discharge well 5 upon the counterweighted cover 28. When a sufficient weight of refuse material has accumulated upon said cover to overcome the balance of said weight 29, the cover swings open to allow the accumulation of refuse to drop out of the well 5, whereupon the cover or door automatically closes again. Each time the door or cover 28 opens a limited amount of air enters the discharge well, thereby supplying sufficient oxygen from time to time for the support of the fuel combustion, but preventing any excess of oxygen.

The material as it travels through the rotating still is subjected to the influence of the heat generated within the furnace shell 1, so that the hydro-carbonaceous content of the material is volatilized or driven off in the form of vapor. The vapor accumulating in the interior of the still escapes through the duct 17 and thence through the discharge passage 16 provided by the tubular journal 12, whence it flows through the pipe 18 to any suitable form of condenser in which the hydrocarbon vapor is reduced to the desired liquid or in other words to the oil desired to be educed from the original material treated. The vapors thus accumulated within the interior of the still will escape in the manner described rather than through either the dipping end 19 or the discharge end 27 of the still, since the damper 8 in the stack 7 will be adjusted to so control the pressure of the products of combustion within the furnace shell 1, that the vapors will discharge readily through the passage 16 because the latter will offer the path of least resistance.

It will be apparent from both the description of the construction and operation of the apparatus, that the same is adapted to operate in a continuous manner and under automatic control, the hopper or magazine being replenished from time to time. Of course, the size and capacity of the hopper may be widely varied to suit the convenience of the user; and also the length of the convoluted still may be widely varied up to any practical limit desired.

In many instances it is desirable to arrange the apparatus so that the same will operate to effect a fractional distillation of the material treated, i. e., the more quickly volatilized hydrocarbonaceous substances which are liberated at comparatively low temperatures will be immediately and separately discharged from said still, while the more slowly volatilized elements will be subsequently and successively and separately discharged after longer subjection to heat at higher temperature is accomplished. To this end I have shown in Fig. 4 a modified arrangement of my novel convoluted still arranged to effect the above mentioned fractional distillation and discharge of hydrocarbonaceous elements of the material treated therein. In this modified construction I tap a convolution of the still 9, toward the forward or receiving end of said still, by means of a transverse duct or pipe 32 which connects with a longitudinal vent pipe 33 running rearwardly to and through the tubular journal 12. Said pipe 33 terminates in a partition member 34 providing a vent chamber 35 at the end of said journal 12, the walls of the latter having lateral perforations 36 through which the first or most quickly volatilized distillate or vapor escapes into an annular chamber 37 provided by a housing 38 in which said journal 12 rotates. A discharge pipe 39 leads out of said chamber 37 to a desired form of condenser (not shown). In like manner, I tap another convolution of the still 9, to the rear of the first tapped convolution, by means of a similar transverse duct 40 which connects with a longitudinal vent pipe 41 preferably arranged in concentric relation to said vent pipe 33. Said vent pipe 41 terminates in a partition member 42 providing a vent chamber 43 within said journal 12 forward of said first mentioned vent chamber 35. The walls of said vent chamber 43 are provided with lateral perforations 44 through which the second distillate or vapor escapes into an annular chamber 45 provided in the housing 38. A discharge pipe 46 leads out of said chamber 45 to a desired form of condenser to which said second distillate is to be delivered. Finally, I tap a rearward convolution of the still 9 by means of the duct 17 which connects with the interior or passage 16 of said journal 12. Said journal 12 is provided with lateral perforations 47 communicating with the passage 16 through which the third distillate or vapor escapes into an annular chamber 48 provided in the housing 38. A discharge pipe 49 leads out of said chamber 48 to a desired form of condenser to which said third distillate is to be delivered. Of course, it will be understood, that from the standpoint of mechanical design, other ways of tapping successively positioned convolutions of said still 9 may be provided other than the specific arrangement above described, consequently the latter arrangement must be considered as merely illustrative, since I conceive the principle of my invention involved in this feature to embrace any mechanical arrangement which will tap the still at different points to render the same practicable for fractional distillation purposes.

I must also call attention to the fact that my novel apparatus above described is adapted for use in the reduction of ores of various kinds, particularly in cases wherein it is desirable to produce such ore reduction in an atmosphere comparatively free from oxygen. In such use of my apparatus the oxygen content of air admitted to the shell 1 is consumed by the combustion of the fuel producing the necessary heat, and since the shell 1 is maintained normally closed by the hopper door 4' at one end and the discharge well door 28 at the opposite end, and since by the operation of the latter door air will only be intermittently admitted into the shell 1, it follows that the oxygen of the admitted air will be consumed in the support of fuel combustion so as to maintain the interior of the still practically free of oxygen.

I am aware that some changes may be made in the construction of the novel eduction and reduction apparatus above described, both with respect to the general arrangements and combinations of parts, as well as with respect to the details of the construction thereof, without departing from the scope and general principles of my invention as described in the foregoing specification and as defined in the following claims. Hence, I do not limit my invention to the exact arrangements and combinations of parts as described in the foregoing specification, nor do I confine myself to the exact details of the construction of the various parts as illustrated in the accompanying drawings.

I claim:—

1. In an apparatus of the kind described, the combination with a furnace shell of a longitudinally disposed spirally convoluted tubular still mounted to rotate within said shell, means at the forward end of said shell for delivering material to be treated in position to be dipped up by the forward end of said still, a normally closed discharge means for receiving the material ejected from the rearward end of said still, a fuel burner communicating with the interior of said shell, a vent stack communicating with the interior of said shell, and means tapping the interior of said still for conveying out of the latter vapors liberated from the material passing therethrough.

2. In an apparatus of the kind described, a rotary spirally convoluted tubular still, means for applying heat about said still, said still having an open forward end adapted to dip up material to be treated from a pile thereof deposited adjacent to said open forward end, said still having an open rearward end out of which the material passing through said still is discharged, and means tapping the interior of said still for conveying out of the latter vapors liberated from the material passing therethrough.

3. In an apparatus of the kind described, a normally closed heating chamber provided with a heat delivery means, a rotary spirally convoluted tubular still arranged within said heating chamber, means for intermittently feeding material in position to be picked up by the forward end of said still, the rotation of said still causing the material to tumble through the same progressively from convolution to convolution of said still until discharged from the rearward end of the same, and means tapping the interior of said still for conveying out of the latter vapors liberated from the material passing therethrough.

4. In an apparatus of the kind described, a furnace shell, a rotary spirally convoluted tubular still within said furnace shell, means tapping the interior of said still for conveying away vapors liberated from material passed through the latter, a vent stack having a damper means communicating with said furnace shell, a heat generating means for delivering products of combustion through said furnace shell, a normally closed means at the forward end of said shell for delivering material to be treated in position to be dipped up by the forward end of said still, a discharge well connected with said furnace shell adjacent to the rearward end of said still adapted to receive material ejected from the latter, and means for normally closing said discharge well.

5. In an apparatus of the kind described, a furnace shell, a rotary spirally convoluted tubular still within said furnace shell, means tapping the interior of said still for conveying away vapors liberated from material passed through the latter, a vent stack having a damper means communicating with said furnace shell, a heat generating means for delivering products of combustion through said furnace shell, a normally closed means at the forward end of said shell for delivering material to be treated in position to be dipped up by the forward end of said still, a discharge well connected with said furnace shell adjacent to the rearward end of said still adapted to receive material ejected from the latter, said discharge well being open at its lower end, a pivoted door closing said lower open end of said discharge well, and a counterweight means normally holding said door closed until the accumulated weight of material overbalances said counterweight means.

6. In an apparatus of the kind described, a furnace shell, a rotary spirally convoluted tubular still within said furnace shell, means tapping the interior of said still for conveying away vapors liberated from material passed through the latter, a vent stack having a damper means communicating with said furnace shell, a heat generating means for delivering products of combustion through said furnace shell, a feed hopper connected with the forward end of said shell above the dipping end of said still, a pivoted cut-off gate closing said hopper against the feeding movement of material, a pivoted cut-off gate actuating plate within said shell, means interconnecting said cut-off gate and said actuating plate whereby the weight of material falling upon the latter will move the same to cause the closing of the former, a discharge well connected with said furnace shell adjacent to the discharging end of said still, and means for normally closing said discharge well.

7. In an apparatus of the kind described, a furnace shell, a rotary spirally convoluted tubular still within said furnace shell, means tapping the interior of said still for conveying away vapors liberated from material passed through the latter, a vent stack having a damper means communicating with said furnace shell, a heat generating means for delivering products of combustion through said furnace shell, a feed hopper connected with the forward end of said shell above the dipping end of said still, a pivoted cut-off gate closing said hopper against the feeding movement of material, a pivoted cut-off gate actuating plate within said shell, means interconnecting said cut-off gate and said actuating plate whereby the weight of material falling upon the latter will move the same to cause the closing of the former, a discharge well connected with said furnace shell adjacent to the discharging end of said still, said discharge well being open at its lower end, a pivoted door closing said lower open end of said discharge well, and a counterweight means normally holding said door closed until the accumulated weight of material overbalances said counterweight means.

8. In an apparatus of the kind described, a rotary spirally convoluted tubular still, said still having an open forward end adapted to dip up material to be treated and an open rearward end for discharging the material passing therethrough, means for tapping the still interior intermediate its ends for conveying out of the same the vapors liberated from the material passing therethrough, and a heating chamber within which said still is mounted wherein a pressure may be maintained sufficient to resist the escape of vapors from the open ends of said still.

In testimony, that I claim the invention set forth above, I have hereunto set my hand this 16th day of June, 1920.

SCHUYLER SCHIEFFELIN.

Witnesses:
ADOLPH HANSEN.
GEORGE D. RICHARDS.